US012618537B2

(12) United States Patent
Albou et al.

(10) Patent No.: US 12,618,537 B2
(45) Date of Patent: May 5, 2026

(54) VERTICAL AUTOMOTIVE LIGHTING MODULE WITH IDENTICAL DAY AND NIGHT LIGHTING ASPECTS

(71) Applicant: VALEO VISION, Bobigny Cedex (FR)

(72) Inventors: Pierre Albou, Bobigny Cedex (FR); Antoine De Lamberterie, Bobigny Cedex (FR); Pierre Renaud, Bobigny Cedex (FR); Vanesa Sanchez, Bobigny Cedex (FR)

(73) Assignee: VALEO VISION, Bobigny Cedex (FR)

( * ) Notice: Subject to any disclaimer, the term of this patent is extended or adjusted under 35 U.S.C. 154(b) by 0 days.

(21) Appl. No.: 18/574,483

(22) PCT Filed: Jun. 28, 2022

(86) PCT No.: PCT/EP2022/067809
§ 371 (c)(1),
(2) Date: Dec. 27, 2023

(87) PCT Pub. No.: WO2023/275100
PCT Pub. Date: Jan. 5, 2023

(65) Prior Publication Data

US 2024/0328589 A1 Oct. 3, 2024

(30) Foreign Application Priority Data

Jun. 30, 2021 (FR) ....................................... 2107118

(51) Int. Cl.
*F21S 41/24* (2018.01)
*F21S 41/143* (2018.01)
(Continued)

(52) U.S. Cl.
CPC ............. *F21S 41/24* (2018.01); *F21S 41/143* (2018.01); *F21S 41/148* (2018.01); *F21S 41/26* (2018.01);
(Continued)

(58) Field of Classification Search
CPC ...... F21S 41/663; F21S 41/322; F21S 41/148; F21S 41/239; F21S 41/24
See application file for complete search history.

(56) References Cited

U.S. PATENT DOCUMENTS 5,365,412 A 11/1994 Koppolu et al.
9,809,150 B2 * 11/2017 Wasilewski .......... B60Q 1/0683
(Continued)

FOREIGN PATENT DOCUMENTS

DE 2 274 158 A 7/1994
DE 198 03 987 A1 8/1998
(Continued)

OTHER PUBLICATIONS

International Search Report mailed on Sep. 19, 2022 in PCT/EP2022/067809 filed on Jun. 28, 2022 (6 pages).
(Continued)

*Primary Examiner* — Matthew J. Peerce
(74) *Attorney, Agent, or Firm* — Oblon, McClelland, Maier & Neustadt, L.L.P.

(57) ABSTRACT

A lighting module for an automotive vehicle includes a plurality of lighting sub-modules each including at least one light source, a flat optical light guide with an input surface, and an output surface and a reflection surface which is capable of reflecting light from the input surface to the output surface. The plurality of lighting sub-modules includes first lighting sub-modules configured to each produce a lighting sub-beam with an upper horizontal cut-off, and second lighting sub-modules configured to each produce a lighting sub-beam without an upper horizontal cut-off. The first and second lighting sub-modules are juxtaposed so as to form, along the juxtaposition, a plurality of alternations between the first and second lighting sub-modules.

16 Claims, 5 Drawing Sheets

(51) Int. Cl.

| | |
|---|---|
| ***F21S 41/148*** | (2018.01) |
| ***F21S 41/26*** | (2018.01) |
| ***F21S 41/32*** | (2018.01) |
| ***F21W 102/155*** | (2018.01) |

(52) U.S. Cl.

CPC ...... *F21S 41/323* (2018.01); *F21W 2102/155* (2018.01)

(56) References Cited

U.S. PATENT DOCUMENTS

| | | | | |
|---|---|---|---|---|
| 10,012,359 | B2 * | 7/2018 | Doha | F21S 43/239 |
| 2007/0247862 | A1 | 10/2007 | Tanghe et al. | |
| 2009/0091944 | A1 | 4/2009 | De Lamberterie | |
| 2011/0085343 | A1 | 4/2011 | Ohno et al. | |
| 2014/0003071 | A1 | 1/2014 | De Lamberterie et al. | |
| 2014/0268847 | A1 * | 9/2014 | Potter | G02B 19/0061 362/511 |
| 2016/0040850 | A1 | 2/2016 | Orisich et al. | |
| 2016/0084463 | A1 | 3/2016 | Potter | |
| 2016/0109084 | A1 | 4/2016 | Potter et al. | |
| 2017/0089540 | A1 | 3/2017 | Sagna et al. | |

FOREIGN PATENT DOCUMENTS

| | | | |
|---|---|---|---|
| DE | 198 38 221 | A1 | 3/1999 |
| EP | 1 850 064 | A1 | 10/2007 |
| EP | 2 045 515 | A1 | 4/2009 |
| EP | 2 679 884 | A1 | 1/2014 |
| EP | 2 778 512 | A1 | 9/2014 |
| FR | 3 103 253 | A1 | 5/2021 |

OTHER PUBLICATIONS

Preliminary French Search Report dated Feb. 14, 2022 in French Application 2107118 filed on Jun. 30, 2021 (3 pages, with Translation of Categories).

* cited by examiner

VERTICAL AUTOMOTIVE LIGHTING MODULE WITH IDENTICAL DAY AND NIGHT LIGHTING ASPECTS

TECHNICAL FIELD

The invention relates to the field of lighting, in particular automotive lighting.

PRIOR ART

Automotive vehicle headlamps currently offer, among other things, three regulatory lighting modes, namely lighting with horizontal upper cut-off, commonly referred to as "low beam", lighting with no cut-off, commonly referred to as "high beam", as well as daytime lighting commonly referred to as "DRL", which stands for "Daytime Running Light".

Published patent EP 2 045 515 A1 discloses a lighting module, specifically with horizontal upper cut-off, that is to say of "low beam" type, comprising a vertical sheet optical guide with one end, on the exit face side, of divergent section and forming a projection lens with the curved exit face. The sheet optical guide comprises a reflection face with a curved profile, of parabolic type, configured to reflect the rays coming from the entry face toward the exit face along an optical axis of the lighting module. For this purpose, the light source(s) facing the entry face are located at the focus of the parabolic profile. This document also provides for the arrangement of several sheet optical guides side by side, these sheets meeting toward the rear at the reflection face and the entry face.

Published patent EP 2 679 884 A1 discloses a lighting module, specifically with horizontal upper cut-off, that is to say of "low beam" type, comprising a flat horizontal optical guide with a series of projection lenses on the exit face and a reflection face with a stepped profile to distribute the light transmitted along the guide toward the various projection lenses.

The lighting modules described above are advantageous in that they can operate in regulatory automotive lighting modes while having an illuminated face, namely the exit face of the optical guide, which is thin and elongate, affording an advantage in terms of integration into a vehicle bodywork. However, they have the disadvantage of operating in only one lighting mode. To operate in the regulatory lighting modes, that is to say with and without horizontal cut-off, it is necessary to provide two lighting modules, where applicable placed side by side. The cumulative exit face then has a different illuminated appearance depending on the lighting mode activated. However, it is desirable for the illuminated or exit face to have an identical or at least similar appearance in the different lighting modes.

SUMMARY OF THE INVENTION

The aim of the invention is to mitigate at least one of the drawbacks of the abovementioned prior art. More particularly, the invention aims to propose an automotive lighting module that operates in at least two lighting modes, preferably a lighting mode with cut-off and a lighting mode without cut-off, while having an essentially constant illuminated appearance. Even more particularly, the invention aims to propose an automotive lighting module having a vertically elongate shape.

The invention relates to a lighting module for an automotive vehicle, comprising a plurality of lighting submodules each comprising at least one light source; a flat optical guide with an entry face facing the at least one light source, an exit face and, at the rear of the exit face, a reflection face capable of reflecting light from the entry face toward the exit face; remarkable in that the plurality of lighting sub-modules comprises first lighting sub-modules configured to each produce a lighting sub-beam with horizontal upper cut-off and second lighting sub-modules configured to each produce a lighting sub-beam without horizontal upper cut-off; and the first and second lighting sub-modules are juxtaposed in such a way as to form, along the juxtaposition, several alternations between the first and second lighting sub-modules.

The term "juxtaposition" means that the lighting sub-modules are arranged side by side with or without clearance.

The term "flat optical guide" means an optical guide with two main guide faces that are opposite and generally parallel, these two faces being generally extensive without necessarily being perfectly flat. These two faces are separated by a perimeter defining a thickness of the flat optical guide, and the thickness may moreover be variable. The entry face, the reflection face and possibly the exit face are located on this perimeter.

According to an advantageous embodiment of the invention, the flat optical guides of the plurality of lighting sub-modules extend in a horizontal or vertical main direction, when the lighting module is in the mounting position and seen from the front.

According to an advantageous embodiment of the invention, the exit faces of the flat optical guides of the plurality of lighting sub-modules are adjacent and form an overall exit face of the lighting module having a height H and a width l, said height H being greater than or equal to 5 times said width l. The adjacent exit faces may be in direct contact or exhibit a clearance, from one to the next.

According to an advantageous embodiment of the invention, the exit faces of the flat optical guides of the plurality of lighting sub-modules each have a width of less than or equal to 5 mm.

According to an advantageous embodiment of the invention, the several alternations between the first and second lighting sub-modules are in a number corresponding to the number of first lighting sub-modules or to the number of second lighting sub-modules.

According to an advantageous embodiment of the invention, the flat optical guides of the plurality of lighting sub-modules form sheets extending in a vertical main direction, when the lighting module is in the mounting position and seen from the front, and are offset longitudinally relative to one another such that the exit faces of said flat optical guides have an inclined and/or curved horizontal profile.

Advantageously, for at least one, preferably each, of the first and/or second lighting sub-modules, the flat optical guide forming a sheet extending vertically is a first flat optical guide and the at least one light source is at least one first light source, said lighting sub-module comprising a second flat optical guide forming a sheet extending vertically, vertically opposite the first flat optical guide, and at least one second light source illuminating an entry face of said second flat optical guide. The second flat optical guide comprises an exit face aligned with the exit face of the first flat optical guide and a reflection face capable of reflecting light from said entry face toward said exit face of said second flat optical guide. The at least one first and second light sources are advantageously arranged on opposite faces of a common plate.

According to an advantageous embodiment of the invention, the exit face of each of the flat optical guides of the plurality of lighting sub-modules has a vertical profile that is stepped and inclined, from top to bottom, rearward.

According to an advantageous embodiment of the invention, for each of the flat optical guides of the plurality of lighting sub-modules, the entry face is transverse to the exit face and the reflection face has a curved vertical profile capable of reflecting the light from the entry face toward the exit face along an optical axis of the corresponding lighting sub-module.

According to an advantageous embodiment of the invention, each of the flat optical guides of the plurality of lighting sub-modules comprises a connection portion with two divergent lateral faces, connecting the sheet to the exit face, said exit face having a curved transverse profile forming a lens.

According to an advantageous embodiment of the invention, the lighting module further comprises additional light sources arranged at the rear of the two divergent faces of the flat optical guides of the plurality of lighting sub-modules, configured to provide a daytime running light.

According to an advantageous embodiment of the invention, the flat optical guides of the plurality of lighting sub-modules extend in a horizontal main direction, when the lighting module is in the mounting position and seen from the front, and are offset longitudinally relative to one another such that the exit faces of said flat optical guides have an inclined or curved vertical profile.

According to an advantageous embodiment of the invention, the exit face of each of the flat optical guides of the plurality of lighting sub-modules has a horizontal profile that is stepped and inclined, from an interior side to an exterior side of the vehicle, rearward.

According to an advantageous embodiment of the invention, for each of the flat optical guides of the plurality of lighting sub-modules, the reflection face comprises facets capable of reflecting the light from the entry face toward lenses on the exit face along an optical axis of the corresponding lighting sub-module.

According to an advantageous embodiment of the invention, for each of the flat optical guides of the plurality of lighting sub-modules, the reflection face has a profile such that a distance between the exit face and the reflection face, along the optical axis of the corresponding lighting sub-module, decreases as a distance between said reflection face and the entry face increases.

According to an advantageous embodiment of the invention, the lighting module further comprises additional light sources arranged at the rear of the reflection faces of the flat optical guides of the plurality of lighting sub-modules, configured to provide a daytime running light.

The invention may relate to a headlamp for an automotive vehicle, comprising a housing forming a cavity, an outer lens closing off the cavity, on the housing, and a lighting module arranged in the cavity, said lighting module being in accordance with the invention.

The measures of the invention are advantageous in that they make it possible to produce a lighting module that operates in at least two regulatory lighting modes while having a very similar, or even identical, illuminated appearance in the various modes. The lighting module may also be elongate vertically and have inclinations or curves in vertical and horizontal planes, which is advantageous for integration into the bodywork of an automotive vehicle. A third lighting mode, namely daytime running light, may also be easily integrated, while maintaining an illuminated appearance that is very similar, or even identical, to those of the other lighting modes.

DETAILED DESCRIPTION

In the description below, the directions and senses expressed by terms such as “front”, “rear”, “longitudinal”, “top”, “bottom”, “interior” and “exterior” are to be understood with the lighting module in the normal position of mounting on the automotive vehicle.

Figure 1:
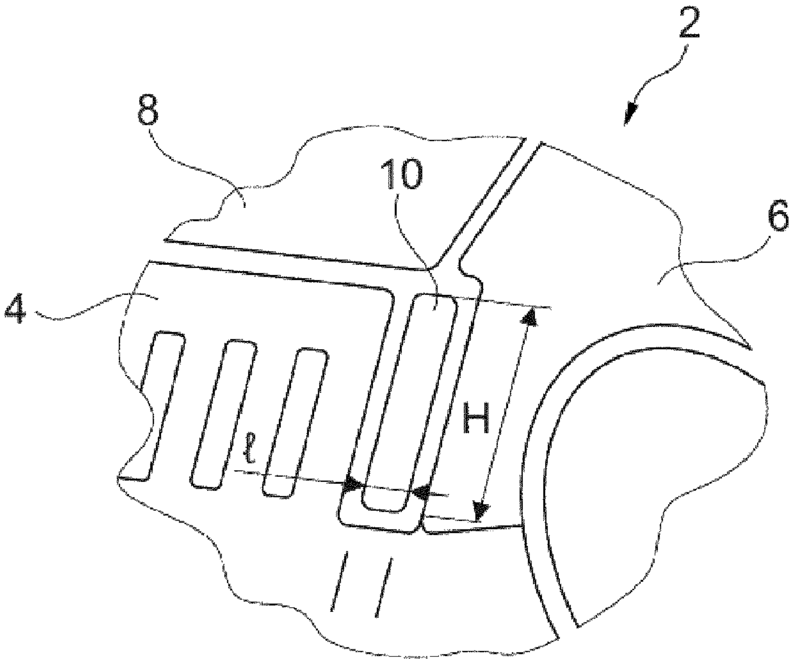
FIG. 1 is a perspective view of the front face of a vehicle equipped with a lighting device according to the invention.

FIG. 1 schematically depicts the left-hand front part of an automotive vehicle equipped with a headlamp according to the invention.

The automotive vehicle 2 comprises a front bumper 4, a left-hand front wing 6 and a hood 8 between which a headlamp 10 is arranged. This is a left-hand headlamp, it being understood that the right-hand headlamp, also according to the invention, is symmetrical to the left-hand headlamp 10 about a vertical median longitudinal plane. The headlamp 10 extends in a vertical main direction. It thus has, at its protective outer lens, a height H and a width l, the height H being greater than or equal to five times the width l. Note also that the protective outer lens of the headlamp 10 may be inclined rearward along its height from bottom to top. Similarly, it may also be inclined rearward along the width from the interior of the vehicle to the exterior of the vehicle. These inclinations may be formed by inclined or curved vertical and horizontal profiles. It will be understood that these inclinations and curved profiles depend on the geometry of the automotive vehicle and are essentially geometric constraints that the present invention makes it possible to integrate. It will thus be understood that these inclinations and curved profiles are not in themselves essential features.

FIGS. 2 to 7 show a lighting module of the headlamp 10 of FIG. 1, according to a first embodiment of the invention.

Figure 2:
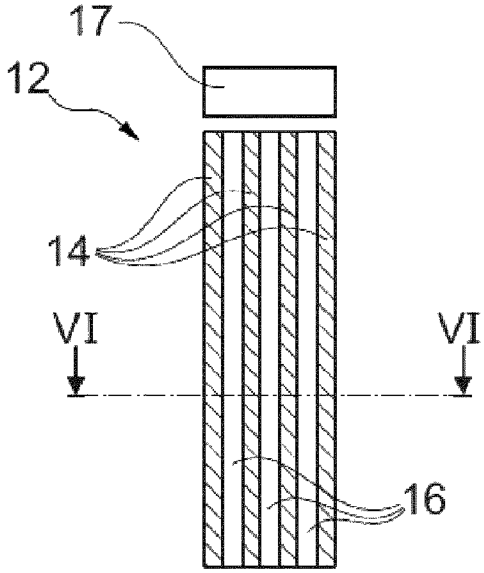
FIG. 2 is an end-on view of a lighting module according to a first embodiment of the invention.

FIG. 2 is an end-on view of the lighting module 12 according to the first embodiment. It comprises a juxtaposition of lighting sub-modules 12 and 14, each consisting essentially of a vertical sheet optical guide and at least one associated light source. The lighting sub-modules comprise first lighting sub-modules 14 each capable of forming a lighting sub-beam with horizontal upper cut-off and second lighting sub-modules 16 each capable of forming a lighting sub-beam without horizontal upper cut-off. The juxtaposition of the first and second lighting sub-modules 14 and 16 is alternating in such a way as to mix the first lighting sub-modules 14 with the second lighting sub-modules 16. In FIG. 2, the first lighting sub-modules 14 are represented by hatched surfaces as opposed to the second lighting sub-modules 16. In FIG. 2, the alternation is perfect in that each lighting sub-module directly adjacent to another lighting sub-module is of the other type. In other words, each lighting sub-module directly adjacent to one of the first lighting sub-modules 14 is one of the second lighting sub-modules 16, and vice versa.

In "low beam" lighting mode, only the first lighting sub-modules 14 are active, that is to say powered on at their light sources. They form first lighting sub-beams with horizontal upper cut-off which, all together, form a first regulatory lighting beam of the type having horizontal upper cut-off or of "low beam" type. Owing to the alternating arrangement of the first and second lighting sub-modules 14 and 16, the overall exit face of the lighting module 12 has an illuminated appearance, at least at a minimum viewing distance, of one meter for example, which is generally homogeneous.

In "high beam" lighting mode, the second lighting sub-modules 16 are active, that is to say powered on at their light sources, advantageously in addition to the first lighting sub-modules 14. In this case, the overall exit face of the lighting module 12 is fully illuminated, thus providing an illuminated appearance close or even identical to that of "low beam" lighting mode. However, note that it may also be envisaged, in "high beam" lighting mode, for only the second lighting sub-modules 16 to be active, in which case the illuminated appearance of the overall exit face of the lighting module 12 is almost identical to that of "high beam" lighting mode.

The similarity in illuminated appearance which has just been explained above is the result of the alternating juxtaposition of the first and second lighting sub-modules 14 and 16, combined with the thinness or reduced width of the first and second lighting sub-modules 14 and 16. Depending on the widths of the first and second lighting sub-modules 14 and 16, their number and the minimum viewing distance, the alternation may deviate from a strict alternation like that shown in FIG. 2. It is in fact possible to group together several of the first lighting sub-modules 14 while providing one or more of the second lighting sub-modules 16 between these groups, and vice versa.

The lighting module 12 may comprise a third lighting sub-module 17, producing a lighting sub-beam with a kinked horizontal upper cut-off, in addition to the first lighting sub-modules 14 producing the lighting sub-beams with a straight horizontal upper cut-off. This lighting sub-beam with a kinked horizontal upper cut-off may be of small horizontal extent in comparison to the combination of lighting sub-beams with a straight horizontal upper cut-off. This third lighting sub-module 17 may be produced in various ways, in themselves well known to those skilled in the art.

Figure 3:
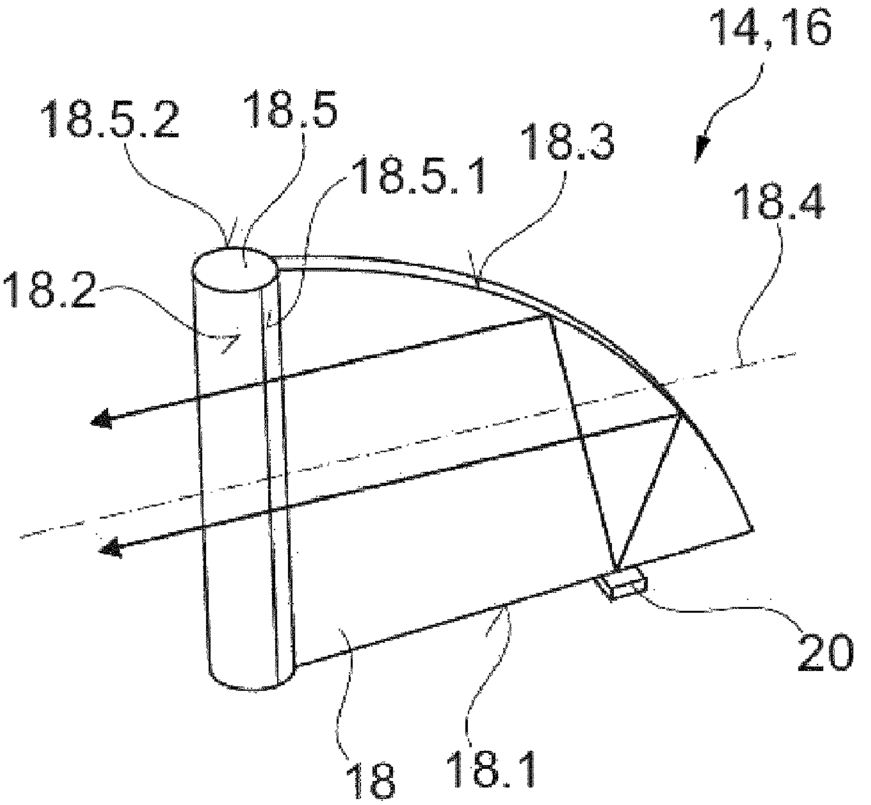
FIG. 3 is a perspective view of a lighting sub-module of the lighting module of FIG. 2.

FIG. 3 is a perspective view of one of the first and second lighting sub-modules 14 and 16. It essentially comprises a sheet optical guide 18 and at least one light source 20. The sheet optical guide 18 comprises an entry face 18.1, an exit face 18.2 and a reflection face 18.3. The at least one light source 20 is arranged facing the entry face 18.1. The reflection face 18.3 has a curved vertical profile, advantageously parabolic, dimensioned to reflect, advantageously by total reflection, the light propagating in the body of the sheet optical guide, from the entry face 18.1 toward the exit face 18.2, along an optical axis 18.4 of the lighting sub-module 14 or 16. In the case of one of the first lighting sub-modules 14, the vertical profile of the reflection face 18.3 is advantageously parabolic with a focus located at the rear edge of the at least one light source 20 in such a way as to reflect all the light rays along the optical axis 18.4 or in a downward direction relative to this axis.

Still in FIG. 3, it can be seen that the exit face 18.2 has a curved horizontal profile, for example circular or elliptical, and is connected to the body of the sheet optical guide by a connection portion 18.5 of the sheet optical guide having two divergent lateral faces 18.5.1 and 18.5.2. This connection portion 18.5 forms, with the exit face 18.2, a projection lens.

Note that the principle of construction and operation of the first and second lighting sub-modules described above in relation to FIGS. 2 and 3 is known per se from published patent EP 2 045 515 A1.

Figure 4:
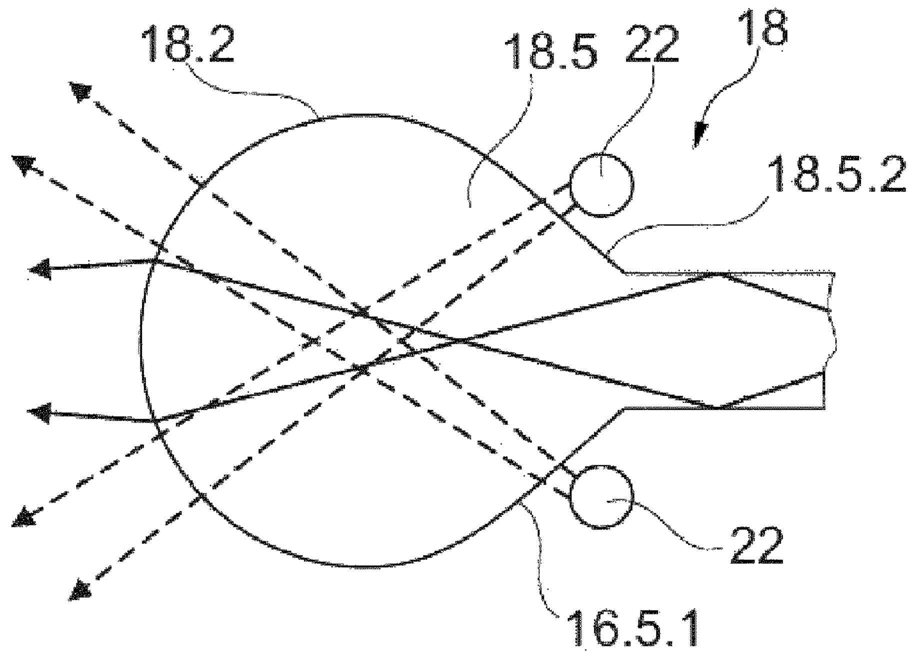
FIG. 4 is a view in horizontal section of the front part of the lighting sub-module of FIG. 3.

FIG. 4 is a view in horizontal section of the front part of the sheet optical guide 18 of FIG. 3. It depicts the paths of two rays, drawn in solid lines, coming from the at least one light source 20 facing the entry face 18.1 (FIG. 3). These rays may spread out horizontally in the connection portion 18.5 and be refracted when passing through the dioptric interface formed by the exit face 18.2.

Additional light sources 22 may be arranged facing at least one of the two lateral faces 18.5.1 and 18.5.2 of the connection portion 18.5. These additional light sources are in this case optical guides of circular section, supplied with light at one end and configured to distribute the light along said optical guide, this light exiting transversely toward the lateral face(s) 18.5.1 and 18.5.2. It will be understood that other optical systems, in particular well known per se, are possible. These additional light sources 22 make it possible to operate in a third lighting mode, namely daytime lighting or "DRL" ("Daytime Running Light") mode. The figure shows four paths of rays, drawn in broken lines, coming from the additional light sources 22. These rays are relatively well spread out horizontally in the connection portion 18.5 and are well spread out upon their exit from the exit face 18.2, which is particularly suitable for this lighting mode.

Figure 5:
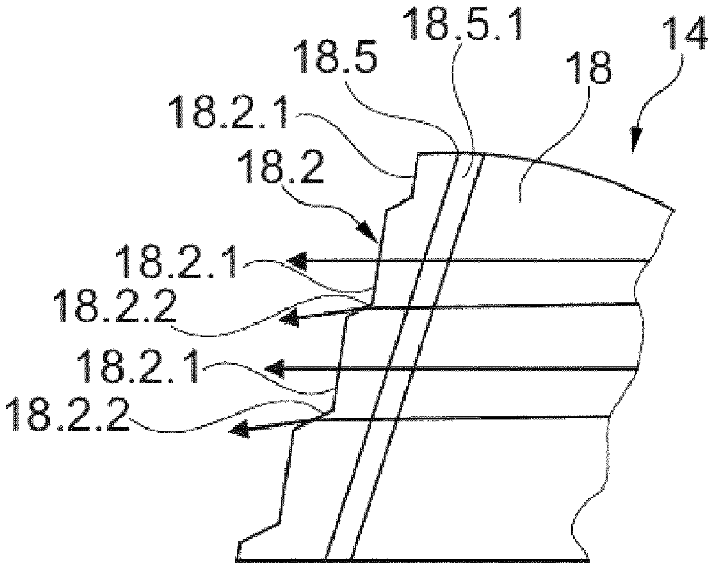
FIG. 5 is a profile view of the lighting module of FIG. 2.

FIG. 5 is a profile view of the lighting module of FIG. 2. It shows one of the first lighting sub-modules 14, it being understood that this illustration also applies to the second lighting sub-modules 16. The exit face 18.2 of the sheet optical guide 18 may have a stepped vertical profile so that the lighting module may have a rearward inclination from the bottom to the top of the overall exit face. As mentioned above, the first lighting sub-modules 14 are configured to produce lighting sub-beams with horizontal upper cut-off. The connection segments 18.2.2 between the vertical segments 18.2.1 of the exit face 18.2 may have a downward inclination, from rear to front, such that the rays meeting them are deflected downward. This means that these connection segments 18.2.2 do not interfere with the horizontal upper cut-off. As FIG. 5 is a profile view, it only shows the front end of the exit face 18.2; it is however understood that the vertical segments 18.2.1 have curved horizontal contours extending vertically and the connection segments 18.2.2 have curved horizontal contours having an inclination which varies along said contour, this inclination being advantageously at a maximum at the front end as shown in FIG. 5.

Figure 6:
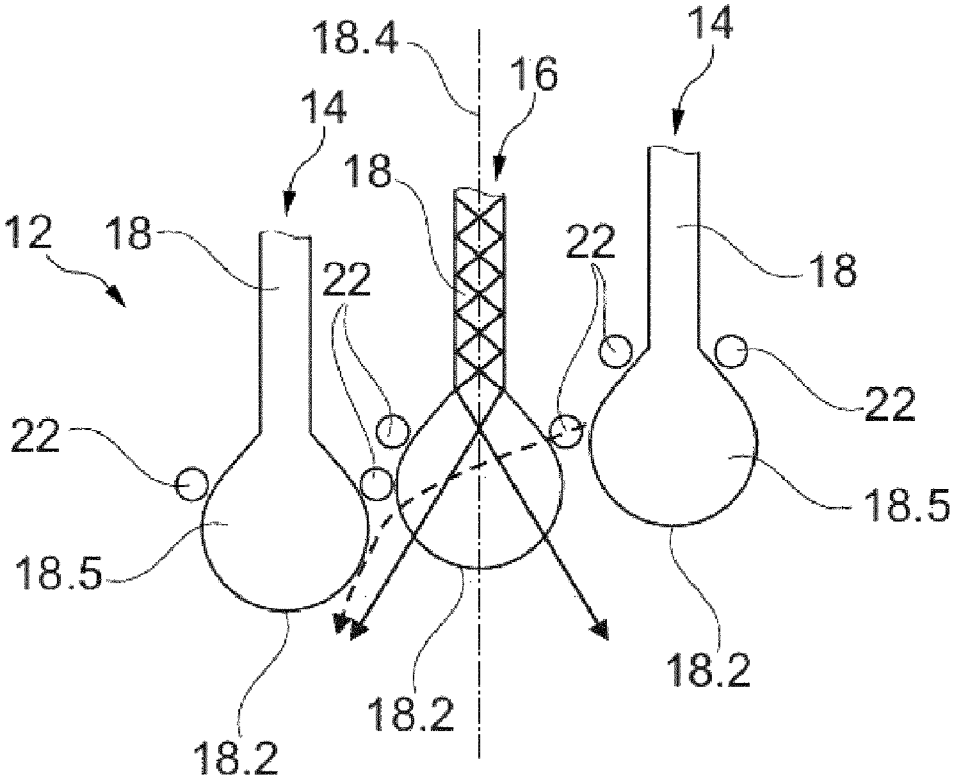
FIG. 6 is a view along section VI-VI of the lighting module of FIG. 2.

FIG. 6 is a view along section VI-VI of the lighting module 12 of FIG. 2. Only three lighting sub-modules, namely two first lighting sub-modules 14 and a second lighting sub-module 16, are shown. It can be seen that the first and second lighting sub-modules 14 and 16 are progressively offset rearwardly from the interior to the exterior of the vehicle, that is to say from left to right in FIG. 6, for a left-hand headlamp of the automotive vehicle. This offset allows the lighting module 12 to present an overall exit face with an inclined profile, as mentioned above in relation to FIG. 1, in particular in order to conform to the bodywork of the automotive vehicle. Such an arrangement may limit the exit face on one side and increase same on the other side. To be specific, considering the second lighting sub-module 16 located between the two first lighting sub-modules 14, the left-hand part (following the orientation of FIG. 6) of the exit face 18.2 is partially occulted by the exit face 18.2 of the first lighting sub-module 14 located to its left and offset toward the front. Similarly, the right-hand part (following the orientation of FIG. 6) of the exit face 18.2 is unobstructed for the light rays of the lighting sub-beam which exit therefrom, because the exit face 18.2 of the first lighting sub-module 14 located to its right is set back rearward. This situation is illustrated by the two ray paths drawn in solid lines, the ray exiting from the left-hand part of the exit face 18.2 passing in front of the exit face 18.2 of the first lighting sub-module 14 on the left and representing the leftward limitation of the exit face for the corresponding lighting sub-beam. As shown by the ray exiting from the right-hand part of the exit face 18.2, this right-hand part is not or only slightly limited by the presence of the first lighting sub-module 14 to its right. In other words, the limitation of the active area of the exit face on one side is compensated for by an increase on the opposite side when the first and second lighting sub-modules are offset longitudinally.

Still in FIG. 6, it can be seen that the light emitted by the additional light sources 22, for daytime running light, is transmitted in the connection portion 18.5 of the sheet optical guide 18 with angles that are more inclined relative to the optical axis 18.4 and may thus exploit a larger area of the exit face 18.2 on the side where the neighboring first lighting sub-module is offset toward the front. A path of a ray, drawn in broken lines, illustrates this phenomenon.

It may be advantageous to space the lighting sub-modules 14 and 16 apart transversely to limit the mutual occultations described above and/or to make the exit faces 18.2 and the connection portions 18.5 asymmetrical with respect to the sheet of the optical guide so as to direct the light more toward the non-occulted side.

It will be understood that what has just been described in relation to one of the second lighting sub-modules 16 also applies to the first lighting sub-modules 14 as long as they are adjacent to second lighting sub-modules 16 offset longitudinally, in a manner similar to FIG. 6.

Figure 7:
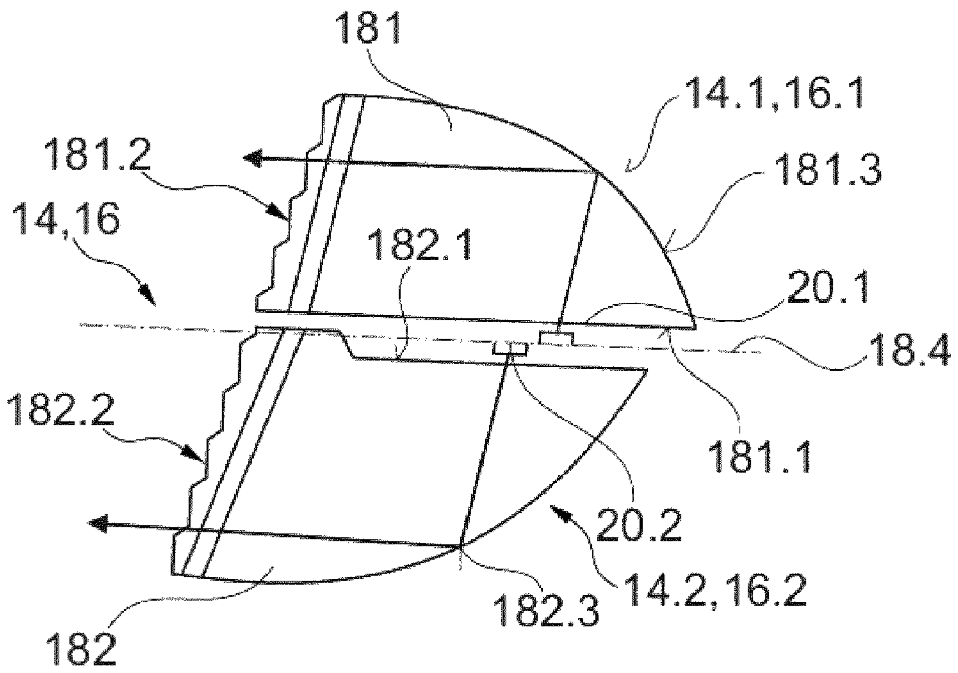
FIG. 7 is a profile view of a variant of the lighting module of FIG. 2.

FIG. 7 is a profile view of a variant of the first and/or second lighting sub-modules 14 and 16. One, several or each of the first and/or second lighting sub-modules 14 and 16 may comprise two lighting sub-modules 14.1 and 14.2 or 16.1 and 16.2 arranged opposite to one another about a horizontal plane, as shown in FIG. 7. The sheet optical guides 181 and 182 of the two lighting sub-modules 14.1 and 14.2 or 16.1 and 16.2 have their entry faces 181.1 and 182.1 facing one another. The respective light sources 20.1 and 20.2 are also opposite to one another and advantageously arranged on the same plate. These light sources 20.1 and 20.2 are advantageously offset longitudinally, that is to say along the optical axis 18.4. This offset helps prevent overheating of the light sources and their surroundings. It makes it possible to take into account the fact that for the top lighting sub-module 14.1, it is advantageously the rear edge of the light source 20.1 which is located at the focus of the parabolic profile of the reflection face 181.3, whereas for the bottom lighting sub-module 14.2, it is advantageously the front edge of the light source 20.2 which is located at the focus of the parabolic profile of the reflection face 182.3. The light source 20.2 could then be located at the rear of the light source 20.1. The offset also makes it possible to compensate for the average longitudinal offset between the two sheet optical guides 181 and 182 owing to the inclined profile, in this case rearward from bottom to top, of the total exit face of the first or second lighting sub-module 14 and 16. The exit faces 181.2 and 182.2 are aligned longitudinally where they are adjacent, in this case at the optical axis 18.4. Such a configuration makes it possible to increase the vertical extent of the first or second lighting sub-module 14 and 16 and to increase the lighting power thereof.

Figure 8:
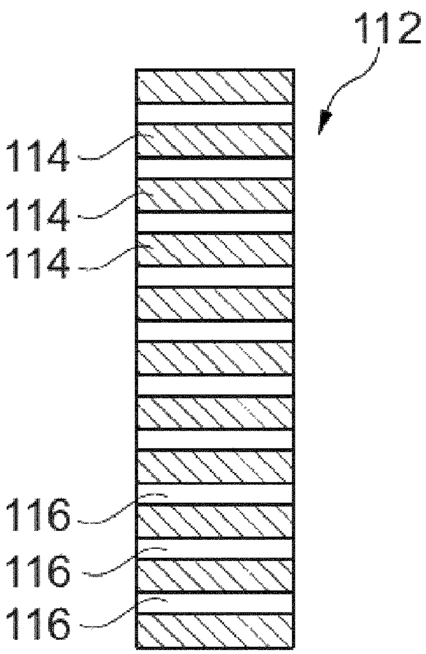
FIG. 8 is an end-on view of a lighting module according to a second embodiment of the invention.
Figure 9:
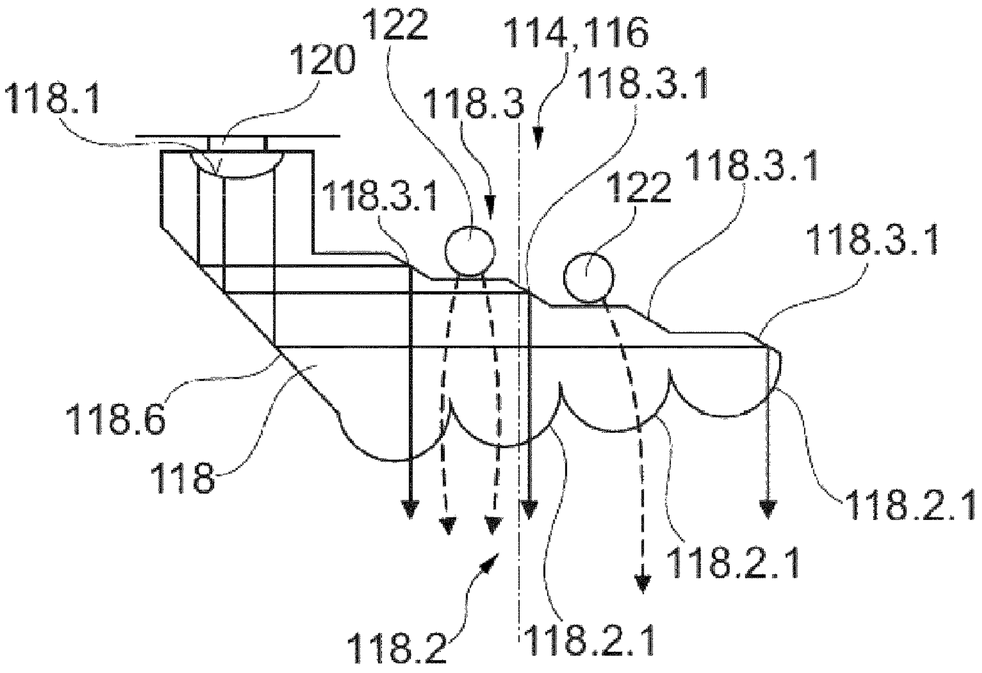
FIG. 9 is a view from above of a lighting sub-module of the lighting module of FIG. 8.

FIGS. 8 and 9 show a lighting module of the headlamp 10 of FIG. 1, according to a second embodiment of the invention. The reference numbers of the first embodiment have been used to designate corresponding or identical elements, these numbers however being increased by 100.

Reference is moreover made to the description of these elements given in the context of the first embodiment. Specific numbers between 100 and 200 are used to designate specific elements.

With reference to FIG. 8, and unlike FIG. 2 relating to the first embodiment, the first and second lighting sub-modules 114 and 116 are arranged horizontally and juxtaposed vertically. Like the first embodiment, the first lighting sub-modules 114 are each capable of forming a lighting sub-beam with horizontal upper cut-off and the second lighting sub-modules 116 are each capable of forming a lighting sub-beam without horizontal upper cut-off. The juxtaposition of the first and second lighting sub-modules 114 and 116 is alternating, as in the first embodiment, in such a way as to mix the first lighting sub-modules 114 with the second lighting sub-modules 116.

FIG. 9 is a top view of one of the first or second lighting sub-modules 114 and 116. It comprises a flat optical guide 118 with an entry face 118.1 for the light emitted by the at least one light source 120, an exit face 118.2 and a reflection face 118.3. The exit face 118.2 comprises reliefs forming projection lenses 118.2.1 and the reflection face 118.3 comprises reflection facets 118.3.1 configured to return, by reflection, light toward the reliefs of the exit face 118.2 forming projection lenses 118.2.1. The reflection facets 118.3.1 are in a stepped arrangement in such a way as to reflect different portions of the light transmitted in the flat optical guide 118. In the present case, the entry face 118.1 is generally parallel to the exit face 118.2 and reflection face 118.3, such that an intermediate reflection face 118.6 is provided between the entry face 118.1 and the main part of the flat optical guide 118 delimited by the exit face 118.2 and reflection face 118.3. It is however possible to envisage providing an entry face 118.1 that is transverse, or even perpendicular, to the main direction of the flat optical guide 118 delimited by the exit face 118.2 and reflection face 118.3, in which case the intermediate reflection face 118.6 is not necessary.

As in the first embodiment, additional light sources 122 may be arranged at the rear of the flat optical guides 118, in this case facing the reflection face 118.3, so as to be able to ensure a third lighting mode, namely a daytime running light.

The first and second lighting sub-modules 114 and 116 may be offset rearwardly, from bottom to top, in such a way as to present an overall exit face with an inclined, or even curved, profile in a vertical plane in order to conform to the bodywork of the automotive vehicle.

As can be seen in FIG. 9, the reliefs on the exit face 118.2 forming the projection lenses 118.2.1 may be progressively offset rearwardly, from the interior to the exterior of the automotive vehicle, in this case from left to right in FIG. 9, in such a way as to present an overall exit face with an inclined, or even curved, profile in a horizontal plane in order to conform to the bodywork of the automotive vehicle.

The horizontal upper cut-off of the sub-beams of the first lighting sub-modules 114 may have a kink, by adapting the reflection facets 118.3.1 and the corresponding projection lenses 118.2.1. The presence of a third projection sub-module ensuring a cut-off with a kink, like the third lighting sub-module 17 (FIG. 2) of the first embodiment, is not necessary. It may however be provided, in a similar manner.

Note that the principle of construction and operation of the first and second lighting sub-modules described above in relation to FIGS. 8 and 9 is known per se from published patent EP 2 679 884 A1.

The invention claimed is:

1. A lighting module for an automotive vehicle, comprising a plurality of lighting sub-modules each comprising:
- at least one light source; and
- a flat optical guide with an entry face facing the at least one light source, an exit face and, at the rear of the exit face, a reflection face configured to reflect light from the entry face toward the exit face, wherein
- the plurality of lighting sub-modules comprises first lighting sub-modules configured to each produce a lighting sub-beam with horizontal upper cut-off and second lighting sub-modules configured to each produce a lighting sub-beam without horizontal upper cut-off,
- the first and second lighting sub-modules are juxtaposed in such a way as to form an arrangement wherein adjacent lighting sub-modules alternate between the first lighting sub-modules configured to produce the lighting sub-beam with horizontal upper cut-off and the second lighting sub-modules configured to produce the lighting sub-beam without horizontal upper cut-off,
- an orientation of the flat optical guides is perpendicular to the main direction in which the flat optical guides extend,
- the flat optical guides of the plurality of lighting submodules form sheets extending in a vertical main direction such that the exit face of each of the flat optical guides has a vertical profile that is stepped and inclined, from top to bottom, rearward, and
- the flat optical guides are longitudinally offset relative to each other such that the exit face of each of the flat optical guides has an inclined or curved horizontal profile.

2. The lighting module as claimed in claim 1, wherein the flat optical guides of the plurality of lighting sub-modules extend in a horizontal or vertical main direction, when the lighting module is in the mounting position and seen from the front.

3. The lighting module as claimed in claim 2, wherein the exit faces of the flat optical guides of the plurality of lighting sub-modules are adjacent and form an overall exit face of the lighting module having a height H and a width 1, said height H being greater than or equal to 5 times said width 1.

4. The lighting module as claimed in claim 2, wherein the alternations between the first and second lighting sub-modules are in a number corresponding to the number of first lighting sub-modules or to the number of second lighting sub-modules.

5. The lighting module as claimed in claim 2, wherein the flat optical guides of the plurality of lighting sub-modules extend in a horizontal main direction, when the lighting module is in the mounting position and seen from the front, and are offset longitudinally relative to one another such that the exit faces of said flat optical guides have an inclined or curved vertical profile.

6. The lighting module as claimed in claim 1, wherein the exit faces of the flat optical guides of the plurality of lighting sub-modules are adjacent and form an overall exit face of the lighting module having a height H and a width 1, said height H being greater than or equal to 5 times said width 1.

7. The lighting module as claimed in claim 6, wherein a number of alternating arrangements between the first and second lighting sub-modules is a number corresponding to the number of first lighting sub-modules or to the number of second lighting sub-modules.

8. The lighting module as claimed in claim 6, wherein the flat optical guides of the plurality of lighting sub-modules extend in a horizontal main direction, when the lighting module is in the mounting position and seen from the front, and are offset longitudinally relative to one another such that the exit faces of said flat optical guides have an inclined or curved vertical profile.

9. The lighting module as claimed in claim 1, wherein a number of alternating arrangements between the first and second lighting sub-modules is a number corresponding to the number of first lighting sub-modules or to the number of second lighting sub-modules.

10. The lighting module as claimed in claim 1, wherein for each of the flat optical guides of the plurality of lighting sub-modules, the entry face is transverse to the exit face and the reflection face has a curved vertical profile capable of reflecting the light from the entry face toward the exit face along an optical axis of the lighting sub-module.

11. The lighting module as claimed in claim 10, wherein each of the flat optical guides of the plurality of lighting sub-modules comprises a connection portion with two divergent lateral faces, connecting the sheet to the exit face, said exit face having a curved transverse profile forming a lens.

12. The lighting module as claimed in claim 1, wherein each of the flat optical guides of the plurality of lighting sub-modules comprises a connection portion with two divergent lateral faces, connecting the sheet to the exit face, said exit face having a curved transverse profile forming a lens.

13. The lighting module as claimed in claim 12, further comprising additional light sources arranged at the rear of the two divergent faces of the flat optical guides of the plurality of lighting sub-modules, configured to provide a daytime running light.

14. The lighting module as claimed in claim 1, wherein the flat optical guides of the plurality of lighting sub-modules extend in a horizontal main direction, when the lighting module is in the mounting position and seen from the front, and are offset longitudinally relative to one another such that the exit faces of said flat optical guides have an inclined or curved vertical profile.

15. The lighting module as claimed in claim 14, wherein, for each of the flat optical guides of the plurality of lighting sub-modules, the reflection face comprises facets capable of reflecting the light from the entry face toward lenses on the exit face along an optical axis of the lighting sub-module, and wherein, for each of the flat optical guides of the plurality of lighting sub-modules, the reflection face has a profile such that a distance between the exit face and the reflection face, along the optical axis of the lighting sub-module, decreases as a distance between said reflection face and the entry face increases.

16. The lighting module as claimed in claim 15, further comprising additional light sources arranged at the rear of the reflection faces of the flat optical guides of the plurality of lighting sub-modules, configured to provide a daytime running light.

* * * * *